United States Patent [19]

Zubler

[11] Patent Number: 4,650,378
[45] Date of Patent: Mar. 17, 1987

[54] METHOD FOR MACHINING A GEAR BY MEANS OF A ROTATING GEAR-TYPE TOOL

[75] Inventor: Ernst Zubler, Zurich, Switzerland

[73] Assignee: Reishauer AG, Zurich, Switzerland

[21] Appl. No.: 771,076

[22] Filed: Aug. 30, 1985

[30] Foreign Application Priority Data

Sep. 5, 1984 [CH] Switzerland .................. 4236/84

[51] Int. Cl.[4] .............................................. B23F 5/04
[52] U.S. Cl. ................................ 409/12; 51/52 HB;
51/95 GH; 409/20; 409/23
[58] Field of Search ............ 51/52 R, 52 HB, 95 GH,
51/105 GG, 287, 165.71; 409/17, 18, 19, 20, 21,
23, 24, 12

[56] References Cited

U.S. PATENT DOCUMENTS

| 1,993,120 | 3/1935 | Stewart | 51/52 R |
| 2,969,621 | 1/1961 | Campbell | 51/287 |
| 4,142,333 | 3/1976 | Fivian | 51/287 |
| 4,372,085 | 2/1983 | Wiener et al. | 51/287 |
| 4,475,319 | 10/1984 | Wirz | 51/95 GH |
| 4,559,744 | 12/1985 | Wirz | 51/287 |

Primary Examiner—John Sipos
Assistant Examiner—Donald R. Studebaker
Attorney, Agent, or Firm—Sughrue, Mion, Zinn, Macpeak & Seas

[57] ABSTRACT

Gear teeth of the gear being worked are machined by rotating the gear with a gear-type machining tool moved radially into tangential contact with the gear being worked. The relative of rotation rates of the gear and the tool are determined by the number of gear teeth in both the gear and the tool. The tooth width of the gear-type machining tool, which may be a worm gear, is less than the finished measurement of the tooth space of the gear being worked. When the gear-type tool reaches the prescribed manufacturing center distance, it is contiguous with the gear from one frontal face to the other. Two flanks of the gear are machined by feeding either the gear or tool in a direction perpendicular to the radial direction of movement so that the teeth of the tool can machine the gear tooth flanks as the gear and the tool rotate. First one flank of each tooth of the gear may be machined and then, by reversing the movement direction, the other flank of the tooth is machined. Alternately, both flanks of each tooth of the gear may be machined simultaneously by using two tools.

7 Claims, 2 Drawing Figures

METHOD FOR MACHINING A GEAR BY MEANS OF A ROTATING GEAR-TYPE TOOL

BACKGROUND OF THE INVENTION

The invention is directed to a method for machining gear teeth and specifically to such a method in which a gear is rotated with a gear-type machining tool in order to effect machining, as by cutting, grinding, shaving and the like, of gear teeth flanks.

As disclosed in German patent specification No. DE-PS 31 50 961 A1, gear teeth may be machined by rotating the gear with a gear-type machining tool, the feeding of the gear into machining engagement with the tool being accomplished by a circular feed in which the basic rotation rate of the gear being worked or the tool is supplemented by a positive or negative additional rotational motion.

Such a machining method is disadvantageous for it is highly expensive and difficult to supplement the basic rotational motion of the gear and tool with an additional rotational motion. A further disadvantage is that the additional rotational motion supplementing the basic rotational motion often causes distortion of the tooth geometry of the gear-type tool. Still further, it is very difficult to check the supplemental rotational motion which is necessary to assure accurate machining of the gear tooth flanks.

SUMMARY OF THE INVENTION

It is an object of the present invention to establish a method for machining a gear using a rotating gear-type tool which method eliminates the disadvantages of the prior art method wherein the basic relative rotational motion of the gear and tool is supplemented by a further rotational motion to affect machining.

A further object of the present invention is to provide a machining method for machining a gear using a rotating gear-type tool in which method the basic rotational motion of the gear and gear-type tool are not supplemented by any additional rotational motion.

The objects of the invention are accomplished in the following manner. Gear teeth of a gear being worked are machined by rotating the gear with a gear-type machining tool moved radially into tangential contact with the gear. The relative rotation rates of the gear and the tool are determined by the number of gear teeth in the gear and the gear-type tool. The tooth width of the gear-type machining tool, which may be in the form of a worm gear, is less than the finished measurement of the curved tooth space of the gear being worked, and thus when the gear-type machining tool has been moved radially to the prescribed manufacturing center distance, it is contiguous with the gear being worked from one frontal side to the other. Tooth flanks of the gear are machined by feeding either of the gear or tool in a linear direction perpendicular to the radial direction of contact between the gear and tool so that the teeth of the tool machine, as by cutting, grinding, honing, shaving, etc., the gear tooth flanks as the gear and tool rotate. First one flank on each tooth is machined. By reversing the linear feed direction the other flank of each tooth is machined.

DETAILED DESCRIPTION OF THE PREFERRED EMBODIMENT

Figure 1:
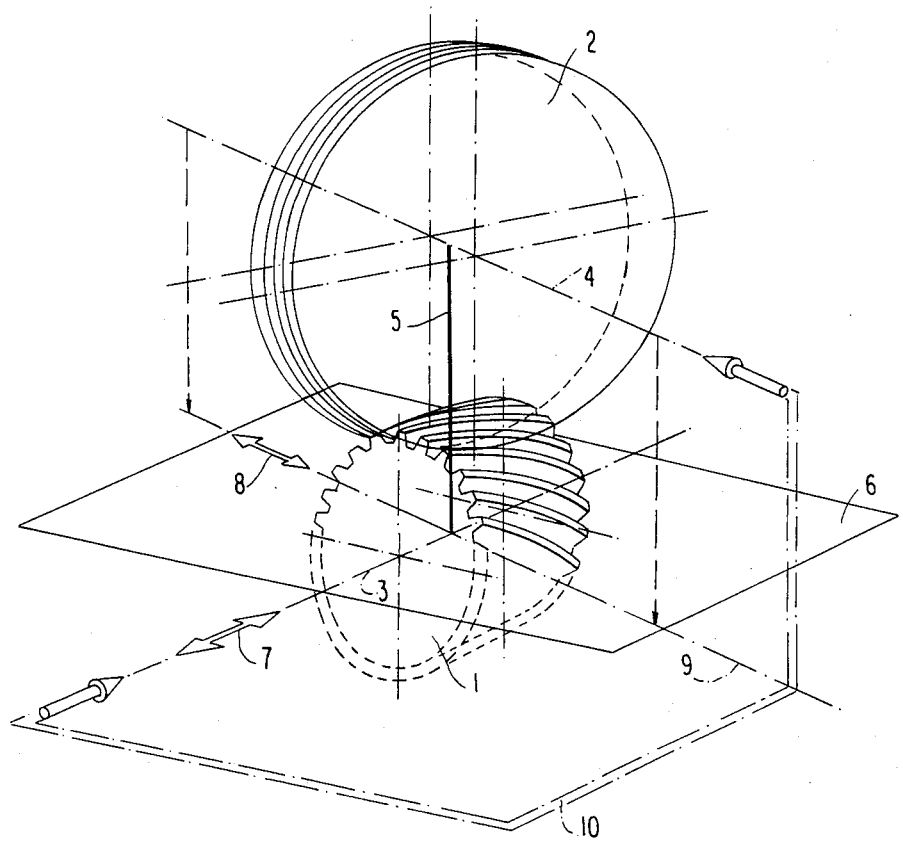
FIG. 1 illustrates the relative positions of the gear being worked and the gear-type machining tool during a machining process along with the linear feed directions of the tool and the gear necessary to accomplish machining of the tooth flanks in accordance with the teachings of the invention.

Referring to FIG. 1, a gear-type machining tool which may be a globoid-type or globoidally-shaped grinding worm 2, is placed in radial contact with a gear 1 being worked. Contact of the tooth profiles of the gear and tool takes place at the prescribed manufacturing center distance since the curved tooth width of the tool 2 is made less than that of the pre-worked tooth space of the gear 1.

One flank of each tooth of the gear is machined by means of a relative forward feed linear motion between the tool 2 and the gear 1 in a plane 6 perpendicular to the center distance line 5. Preferably, the forward feed motion is along the axis 3 of the gear in the direction 7 or along the axis 4 corresponding to the tool axis. The forward feed motion may also be along the direction 8 in the projection 9 of the tool axis 4. After one flank of each tooth of the gear is machined the other flank is machined, by reversing the direction of the feed motion.

Feed motion may progress constantly, in a constantly changing manner or in stepped stages, in both the rough and fine finishing of tooth flanks. If desired, the progress of the feed motion may be a combination of these three possible types of progressions.

The foregoing procedure is applicable to the machining of internal gears as well as external gears. To machine external gears, the gear-type tool may be an external gear having a profile shaped globoidally or hyperboloidally. An internal gear may also be machined with an external gear-type machining tool in which case the profile of the tool is preferably drum-shaped. It should be further understood that the external gear may be machined with a internal gear-type tool, the tool having a profile shaped globoidally or hyperboloidally. Also, the internal gear to be machined may be machined with an external gear-type tool having a drum-shaped profile. In each of the foregoing cases, the gear-type tool be it an internal or an external gear-type tool, may be a honing, shaving, or the like type of a machining tool.

The tool may be dressed in a conventional way such as in the way described in the German patent specification No. DE-PS 31 50 961 A1. Dressing is accomplished by means of a dressing tool whose geometry corresponds to that of the gear 1 to be manufactured. The condition of the dressing procedure is that the dressing tool accomplish the exact same relative motion in relation to the tool 2 as that to be accomplished in the course of the machining of the gear 1, inasmuch as the same gear tooth width measurement is to be produced on the gear 1 as is present on the dressing tool. Otherwise, a variation in magnitude of the forward feed motions of the dressing and the machine processes, respectively, might affect the gear tooth width measurements of the gear 1.

The required movement in a linear direction along the gear axis 3, tool axis 4 or the projection 9 of the tool axis may be controlled by any suitable, conventional, electrical or mechanical means.

Figure 2:
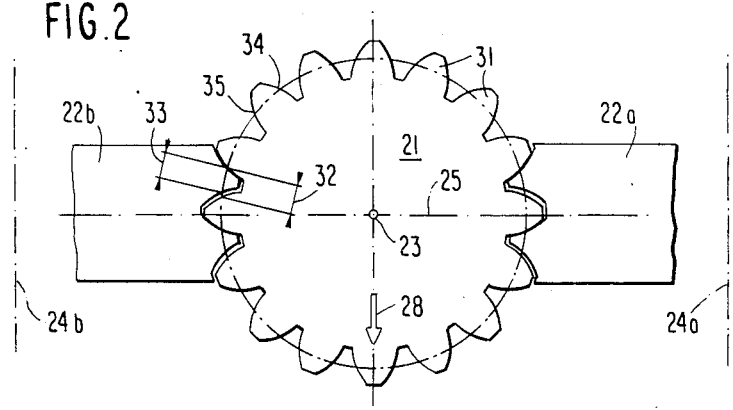
FIG. 2 illustrates an embodiment with simultaneous machining of both flanks of the gear teeth.

Referring to FIG. 2, a further embodiment is shown where the two flanks 34, 35 of the teeth 31 of the gear 21 are ground simultaneously by two globoid-type grinding worms 22a, 22b. The feed movement 28 of the gear 21 relative to the grinding worms 22a, 22b is again in a plane perpendicular to the shortest distance line 25 between the axis 23 of the gear 21 and the two axis 24a, 24b of the grinding worms 22a, 22b, i.e. the feed movement 28 is in a plane parallel to all three axis 23, 24a, 24b. As FIG. 2 is a radial cross section through the center of the gear 21, the clearance between the tooth width 33 of the tools 22a, 22b and the width 32 of the tooth space of the gear 21 is visible in this figure.

What is claimed is:

1. A process for machining the teeth of a gear comprising the steps of:
    causing the gear to rotate relative to a globoidally-shaped gear-like machining tool, said tool having a tooth width less than the finished measurement of the width of the tooth space of the gear;
    radially moving one of said gear and tool to bring the gear and tool into tangential contact at the prescribed manufacturing center distance; and
    moving at least one of said gear and tool in a first direction of movement while continuously rotating both tool and gear so as to machine at least one flank of each gear tooth.

2. A process for machining the teeth of the gear as claimed in claim 1 comprising the further step of moving at least one of said gear and tool in a second direction opposite to said first direction in said plane perpendicular to said radial direction of movement to machine the other flank of each gear tooth.

3. A process for machining the teeth of a gear as claimed in claim 1 wherein said step of moving at least one of said gear and tool in a first direction includes the step of moving the gear in its axial direction.

4. The process for machining the teeth of a gear as claimed in claim 1 wherein said step of moving at least one of said gear and tool in a first direction includes the step of moving said tool in its axial direction.

5. The process for machining the teeth of a gear as claimed in claim 1 wherein said step of moving at least one of said gear and tool in a first direction so as to machine at least one flank of each gear tooth as the gear rotates relative to the gear-like machining tool includes the further steps of both rough and fine finishing of the tooth flanks in at least one of a continuous and a staged operation.

6. The process for machining the teeth of a gear as claimed in claim 1 further including the step of simultaneously machining both flanks of the gear teeth using two gear-like machining tools.

7. The process for machining the teeth of a gear as claimed in claim 1 further comprising the step of machining the tool profile with a dressing tool whose geometry corresponds exactly to that of the desired gear.

* * * * *